United States Patent
Liang

(10) Patent No.: US 8,753,768 B2
(45) Date of Patent: Jun. 17, 2014

(54) ELECTRICAL CONNECTION STRUCTURE FOR INCREASING THE SECURING RELIABILITY AND METHOD OF MANUFACTURING THE SAME, AND BATTERY PACK STRUCTURE

(75) Inventor: Wen-Lung Liang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 447 days.

(21) Appl. No.: 13/244,056

(22) Filed: Sep. 23, 2011

(65) Prior Publication Data

US 2013/0004821 A1 Jan. 3, 2013

(30) Foreign Application Priority Data

Jun. 29, 2011 (TW) .............................. 100122844 A

(51) Int. Cl.
*H01M 2/04* (2006.01)
*H01M 2/06* (2006.01)
*H01M 2/08* (2006.01)

(52) U.S. Cl.
CPC .............. *H01M 2/0421* (2013.01); *H01M 2/04* (2013.01); *H01M 2/06* (2013.01); *H01M 2/08* (2013.01)
USPC .............. 429/184; 429/99; 429/120; 429/151

(58) Field of Classification Search
CPC ....... H01M 2/00; H01M 2/02; H01M 2/0207; H01M 2/0222; H01M 2/04; H01M 2/0421; H01M 2/06; H01M 2/08
USPC ........... 429/99, 100, 120, 151, 153, 154, 184; 439/500, 627, 634, 638, 641
See application file for complete search history.

(56) References Cited

U.S. PATENT DOCUMENTS

| | | | | |
|---|---|---|---|---|
| 2007/0138401 A1* | 6/2007 | Tokhtuev et al. | ............. | 250/373 |
| 2007/0178368 A1* | 8/2007 | Wu et al. | ......................... | 429/97 |
| 2010/0310963 A1* | 12/2010 | Ueda | ............................ | 429/458 |

* cited by examiner

*Primary Examiner* — Jonathan G Leong
*Assistant Examiner* — James Erwin
(74) *Attorney, Agent, or Firm* — Li & Cai Intellectual Property (USA) Office

(57) ABSTRACT

An electrical connection structure includes an insulating unit, a heat insulation unit, a conductive unit, a securing unit, and a filling unit. The insulating unit includes an insulating body having a receiving groove and a first securing hole. The heat insulation unit includes a heat insulation body received in the receiving groove. The heat insulation body has a heat insulation groove and a second securing hole. The conductive unit includes a conductive body disposed on the insulating body. The conductive body has a securing piece extended into the heat insulation groove. The securing piece has a third securing hole. The securing unit includes a securing element sequentially passing through the third, the second, and the first securing holes for fixing the securing piece in the heat insulation groove. The filling unit includes a filling material received in the heat insulation groove to cover and fix the securing element.

16 Claims, 11 Drawing Sheets

ELECTRICAL CONNECTION STRUCTURE FOR INCREASING THE SECURING RELIABILITY AND METHOD OF MANUFACTURING THE SAME, AND BATTERY PACK STRUCTURE

BACKGROUND OF THE INVENTION

1. Field of the Invention

The instant disclosure relates to an electrical connection structure and a method of manufacturing the same, and a battery pack structure, and more particularly, to an electrical connection structure for increasing the securing reliability and a method of manufacturing the same, and a battery pack structure.

2. Description of Related Art

It is noted that lithium batteries can be extremely dangerous if mistreated or if the metals containing therein is contaminated. They may ignited or explode if overheated or if charged to an excessively high voltage. Therefore, it can be very difficult to manufacture a large lithium battery of high voltage or high current, not to mention that it can also be very expensive. Conventionally, it is common to form a battery pack by connecting a plurality of cells, such as nickel metal hydride cells or nickel-cadmium cells, in series or in parallel while packing the same inside a battery case so as to be used as a large battery with high power output. However, it is easy for the securing elements to loosen from the battery pack due to the impact or the shake by external force.

SUMMARY OF THE INVENTION

One aspect of the instant disclosure relates to an electrical connection structure for increasing the securing reliability in order to prevent securing elements from being loosened.

Another aspect of the instant disclosure relates to a method of manufacturing an electrical connection structure for increasing the securing reliability in order to prevent securing elements from being loosened.

Another aspect of the instant disclosure relates to a battery pack structure for increasing the securing reliability in order to prevent securing elements from being loosened.

One of the embodiments of the instant disclosure provides an electrical connection structure for increasing the securing reliability, comprising: an insulating unit, a heat insulation unit, a conductive unit, a securing unit, and a filling unit. The insulating unit includes at least one insulating body, wherein the at least one insulating body has at least one receiving groove and at least one first securing hole penetrating through the at least one receiving groove. The heat insulation unit includes at least one heat insulation body received in the at least one receiving groove, wherein the at least one heat insulation body has at least one heat insulation groove and at least one second securing hole penetrating through the at least one heat insulation groove and corresponding to the at least one first securing hole. The conductive unit includes at least one conductive body disposed on the at least one insulating body, wherein the at least one conductive body has at least one securing piece downwardly extended into the at least one heat insulation groove, and the at least one securing piece has at least one third securing hole corresponding to the at least one second securing hole. The securing unit includes at least one securing element, wherein the at least one securing element sequentially passes through the at least one third securing hole, the at least one second securing hole, and the at least one first securing hole for fixing the at least one securing piece in the at least one heat insulation groove. The filling unit includes a filling material received in the at least one heat insulation groove to cover and fix the at least one securing element.

Another of the embodiments of the instant disclosure provides a method of manufacturing an electrical connection structure for increasing the securing reliability, comprising: providing at least one insulating body, wherein the at least one insulating body has at least one receiving groove and at least one first securing hole penetrating through the at least one receiving groove; receiving at least one heat insulation body in the at least one receiving groove, wherein the at least one heat insulation body has at least one heat insulation groove and at least one second securing hole penetrating through the at least one heat insulation groove and corresponding to the at least one first securing hole; placing at least one conductive body on the at least one insulating body, wherein the at least one conductive body has at least one securing piece downwardly extended into the at least one heat insulation groove, and the at least one securing piece has at least one third securing hole corresponding to the at least one second securing hole; sequentially passing at least one securing element through the at least one third securing hole, the at least one second securing hole, and the at least one first securing hole for fixing the at least one securing piece in the at least one heat insulation groove; and filling a filling material into the at least one heat insulation groove to cover and fix the at least one securing element.

Furthermore, the step of filling the filling material into the at least one heat insulation groove further comprises: filling a liquid filler into the at least one heat insulation groove, and then solidifying the liquid filler to form the filling material that has been fixed inside the at least one heat insulation groove. In addition, after the step of filling the filling material into the at least one heat insulation groove, the method further comprises: removing the filling material to expose the at least one securing element, and then removing the at least one securing element to separate the at least one conductive body from the at least one insulating body.

Another of the embodiments of the instant disclosure provides a battery pack structure, comprising: an outer casing unit, a battery unit, an insulating unit, a heat insulation unit, a conductive unit, a securing unit, and a filling unit. The outer casing unit includes at least one outer casing body. The battery unit includes a plurality of energy storing elements received inside the at least one outer casing body. The insulating unit includes at least one insulating body disposed on the outer casing body to partially cover the battery unit, wherein the at least one insulating body has at least one receiving groove and at least one first securing hole penetrating through the at least one receiving groove. The heat insulation unit includes at least one heat insulation body received in the at least one receiving groove, wherein the at least one heat insulation body has at least one heat insulation groove and at least one second securing hole penetrating through the at least one heat insulation groove and corresponding to the at least one first securing hole. The conductive unit includes at least one conductive body disposed on the at least one insulating body and electrically connected to the battery unit, wherein the at least one conductive body has at least one securing piece downwardly extended into the at least one heat insulation groove, and the at least one securing piece has at least one third securing hole corresponding to the at least one second securing hole. The securing unit includes at least one securing element, wherein the at least one securing element sequentially passes through the at least one third securing hole, the at least one second securing hole, and the at least one first securing hole for fixing the at least one securing piece in the at least one heat insulation groove. The filling unit includes a filling material received in the at least one heat insulation groove to cover and fix the at least one securing element.

Therefore, because the filling material can be received in the at least one heat insulation groove to cover and fix the at least one securing element, the instant disclosure can prevent the at least one securing element from being loosened from the electrical connection structure or the battery pack structure.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1A:
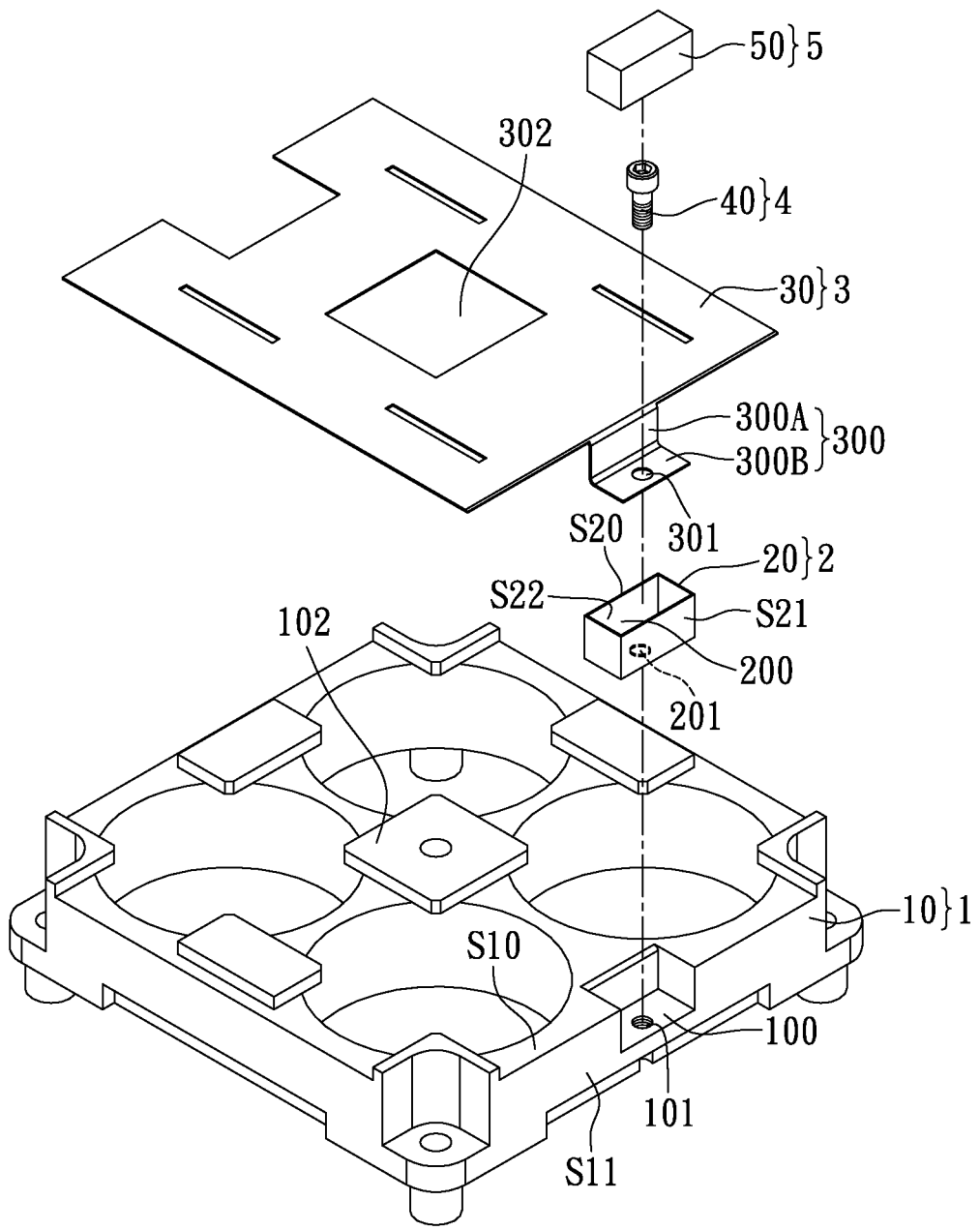
FIG. 1A shows one perspective, exploded, schematic view of the electrical connection structure for increasing the securing reliability according to the first embodiment of the instant disclosure.
Figure 1B:
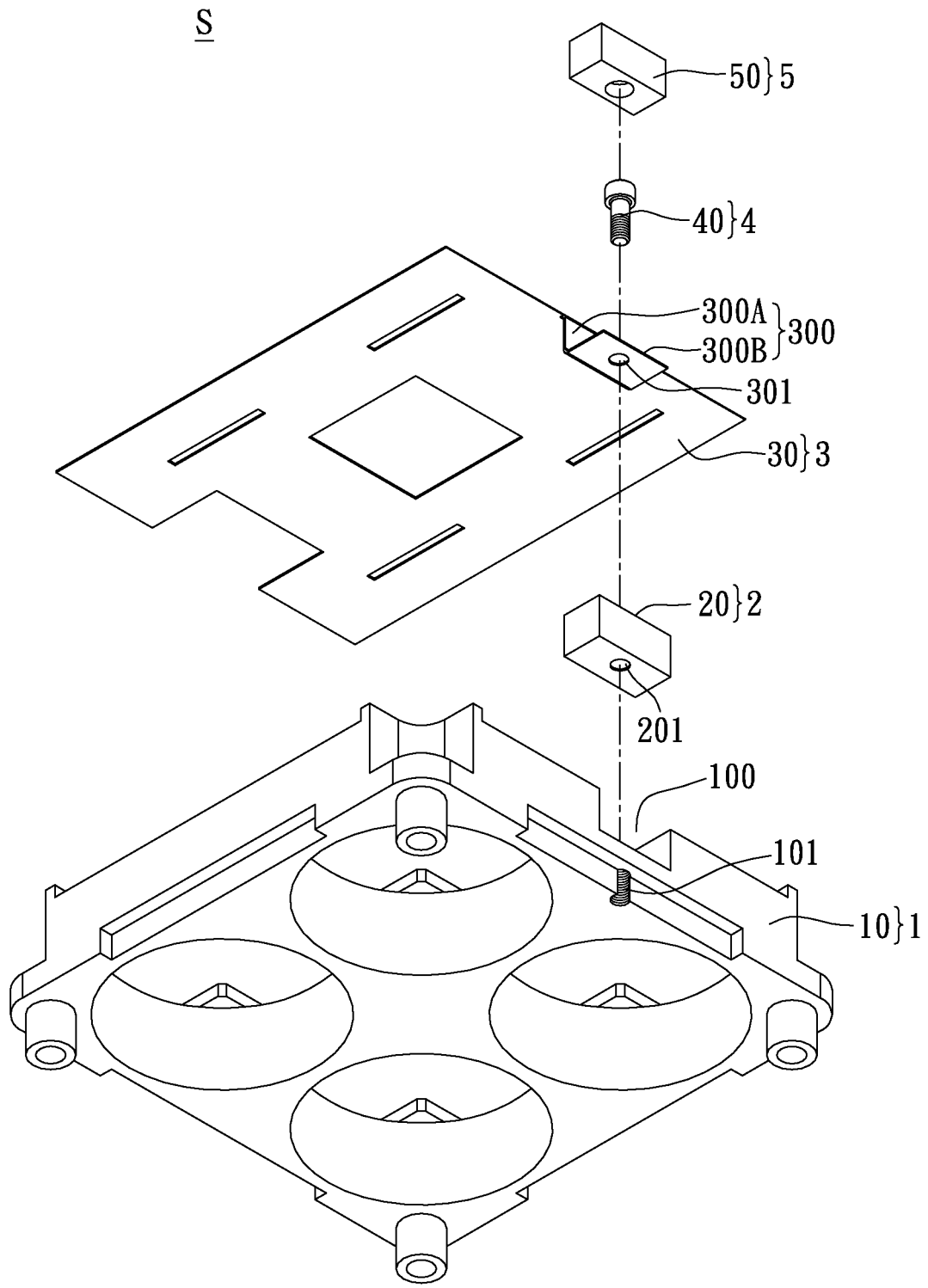
FIG. 1B shows another perspective, exploded, schematic view of the electrical connection structure for increasing the securing reliability according to the first embodiment of the instant disclosure.
Figure 1C:
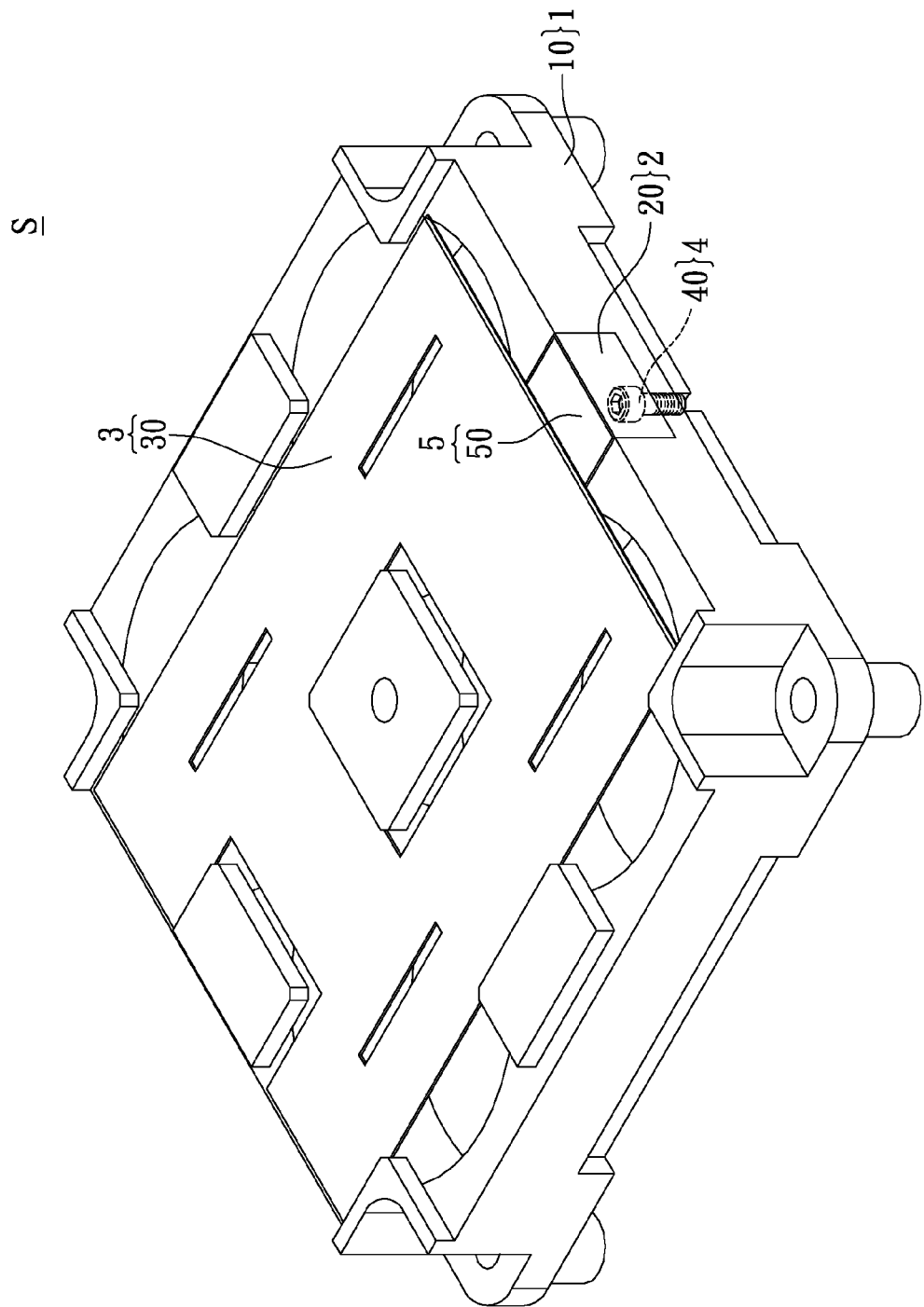
FIG. 1C shows a perspective, assembled, schematic view of the electrical connection structure for increasing the securing reliability according to the first embodiment of the instant disclosure.

Referring to FIGS. 1A, 1B, and 1C, in which FIG. 1A is one perspective exploded schematic diagram, FIG. 1B is another perspective exploded schematic diagram, and FIG. 1C is a perspective assembled schematic diagram. The first embodiment of the instant disclosure provides an electrical connection structure S for increasing the securing reliability, comprising: an insulating unit 1, a heat insulation unit 2, a conductive unit 3, a securing unit 4, and a filling unit 5.

Furthermore, the insulating unit 1 includes at least one insulating body 10, and the insulating body 10 has at least one receiving groove 100 and at least one first securing hole 101 penetrating through the receiving groove 100. For example, the insulating body 10 is a single plastic injection element, thus the receiving groove 100 and at least one first securing hole 101 are simultaneously formed on the insulating body 10 during the injection molding process. Of course, an insulating body without at least one receiving groove and at least one first securing hole can be manufactured first, and then forming at least one receiving groove 100 and at least one first securing hole 101 on the insulating body 10. However, the material property of the insulating body 10 used by the instant disclosure and the method of forming the receiving groove 100 and at least one first securing hole 101 in the instant disclosure are merely examples and are not meant to limit the instant disclosure.

Moreover, the heat insulation unit 2 includes at least one heat insulation body 20 received in the receiving groove 100, and the heat insulation body 20 has at least one heat insulation groove 200 and at least one second securing hole 201 penetrating through the heat insulation groove 200 and corresponding to the first securing hole 101. For example, the receiving groove 100 can be downwardly concaved from the top surface S10 of the insulating body 10 and inwardly concaved from one lateral surface S11 of the insulating body 10, thus the receiving groove 100 has only two openings communicated with each other and respectively connected with the top surface S10 and the lateral surface S11 of the insulating body 10. In addition, the top surface S20 of the heat insulation body 20 can be substantially flushed with the top surface S10 of the insulating body 10, and one lateral surface S21 of the heat insulation body 20 can be substantially flushed with the lateral surface S11 of the insulating body 10. However, the position design of the receiving groove 100 in the instant disclosure is an example and is not meant to limit the instant disclosure, for instance, the receiving groove 100 can be only downwardly concaved from the top surface S10 of the insulating body 10, thus the receiving groove 100 has only one opening connected with the top surface S10 of the insulating body 10. In addition, with regard to the material used by the heat insulation body 20, the heat insulation body 20 can be made of metal material, plastic material, and glass material, etc. However, the material of the heat insulation body 20 used by the instant disclosure is an example and is not meant to limit the instant disclosure.

Besides, the conductive unit 3 includes at least one conductive body 30 disposed on the insulating body 10. The conductive body 30 has at least one securing piece 300 downwardly extended into the heat insulation groove 200, and the securing piece 300 has at least one third securing hole 301 corresponding to the second securing hole 201. For example, the securing piece 300 has a bending portion 300A downwardly bent from the conductive body 30 and a securing portion 300B outwardly extended from the bending portion 300A. The third securing hole 301 can pass through the securing portion 300B, and the bending portion 300A and the securing portion 300B can tightly contact the inner surface S22 of the heat insulation body 20, and the bending portion and the securing portion are covered with the filling material. However, the appearance design of the securing piece 300 used by the instant disclosure is an example and is not meant to limit the instant disclosure. In addition, the conductive body 30 has at least one positioning opening 302, and the insulating body 10 has at least one positioning protrusion 102 corresponding to the positioning opening 302 and passing through the positioning opening 302. Hence, when the positioning protrusion 102 of the insulating body 10 passes through the positioning opening 302 of the conductive body 30, the conductive body 30 can be certainly placed on the insulating body 10 to limit the conductive body 30 to slightly move in a predetermined area.

Furthermore, the securing unit 4 includes at least one securing element 40, and the securing element 40 sequentially passes through the third securing hole 301, the second securing hole 201, and the first securing hole 101 for fixing the securing piece 300 in the heat insulation groove 200. For example, the securing element 40 may be a bolt having an external thread, and the insulating body 10 has an internal thread formed on the inner surface of the first securing hole 101 to mate with the external thread. Hence, the bolt can sequentially pass through the third securing hole 301, the second securing hole 201, and the first securing hole 101 for fixing the position of the heat insulation body 20 relative to the insulating body 10 and fixing the position of the conductive body 30 relative to the heat insulation body 20. However, the securing element 40 used by the instant disclosure is an example and is not meant to limit the instant disclosure.

Moreover, the filling unit 5 includes a filling material 50 received in the heat insulation groove 200, and both the securing piece 300 (including the bending portion 300A and the securing portion 300B) and the securing element 40 can be covered with the filling material 50 at the same time, thus the securing element 40 can be firmly positioned by the filling material 50. The position of the securing element 40 can be fixed by the filling material 50 even though the securing element 40 is frequently impacted or shaken by external force, thus the position of the heat insulation body 20 relative to the insulating body 10 and the position of the conductive body 30 relative to the heat insulation body 20 can be certainly fixed. For example, the filling material 50 may be a solder material or any type of package material. However, the material of the filling material 50 used by the instant disclosure is an example and is not meant to limit the instant disclosure.

Figure 2:
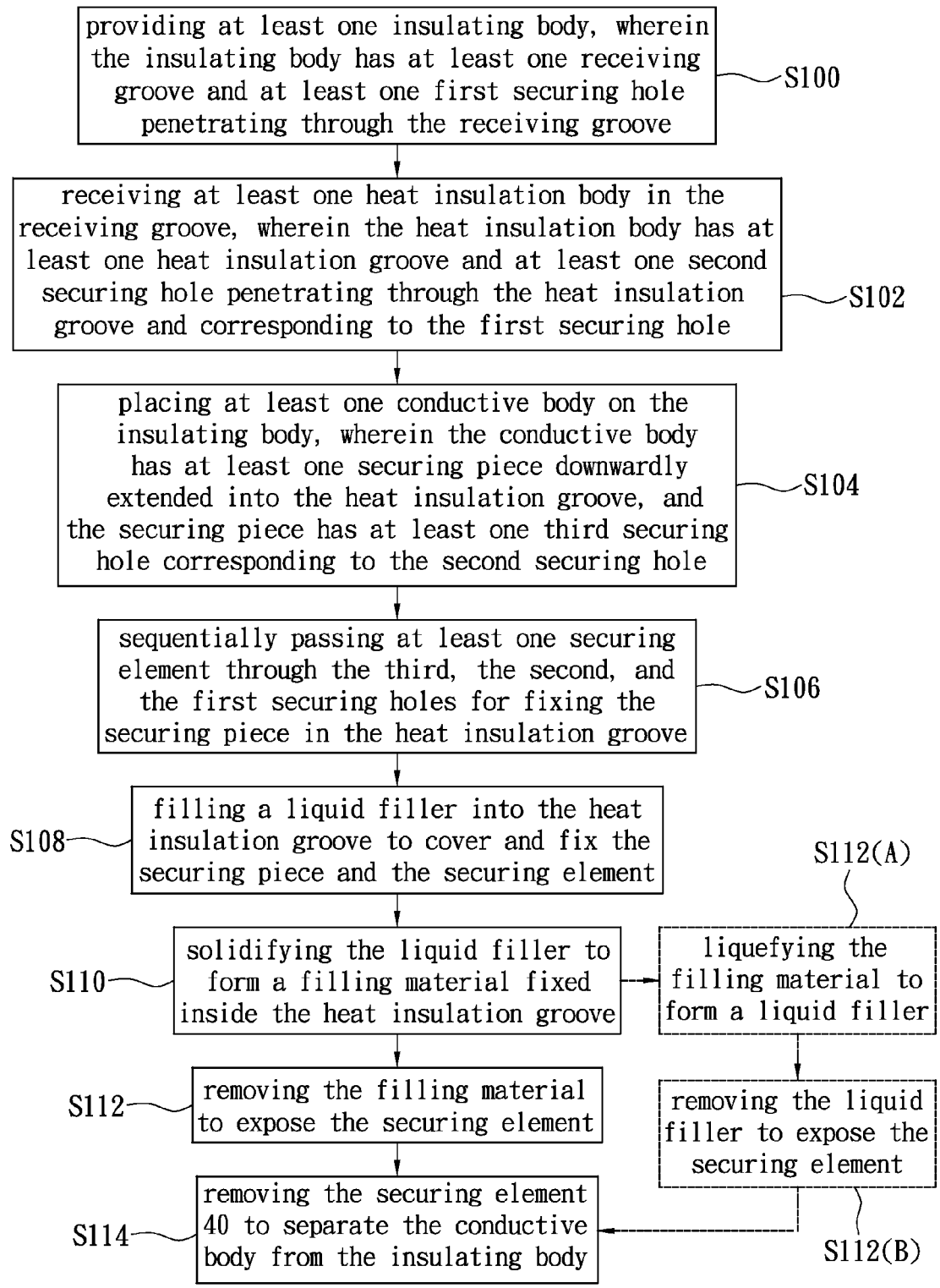
FIG. 2 shows a flow chart of the method of manufacturing an electrical connection structure for increasing the securing reliability according to the first embodiment of the instant disclosure.
Figure 3A:
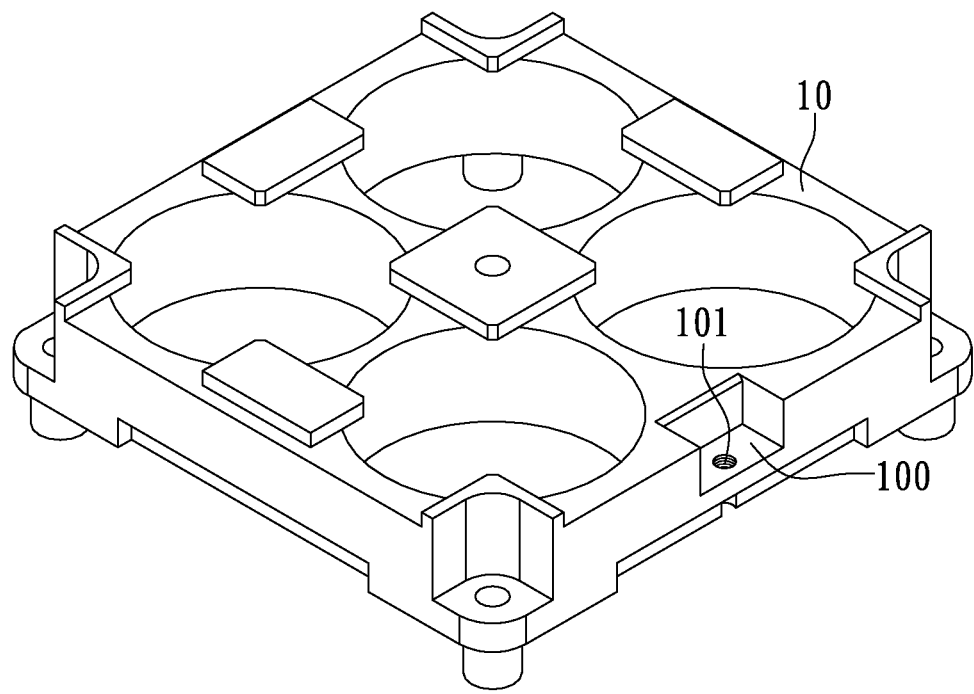
FIG. 3A shows a perspective, schematic view of the step S100 according to the first embodiment of the instant disclosure.

Referring to FIGS. 2 and 3A to 3E, in which FIG. 2 is a flow chart and FIGS. 3A to 3E are perspective schematic diagrams. The first embodiment of the instant disclosure provides a method of manufacturing an electrical connection structure S for increasing the securing reliability, comprising the steps from S100 to S108:

The step S100 is that: referring to FIGS. 1A, 2, and 3A, providing at least one insulating body 10, wherein the insulating body 10 has at least one receiving groove 100 and at least one first securing hole 101 penetrating through the receiving groove 100.

Figure 3B:
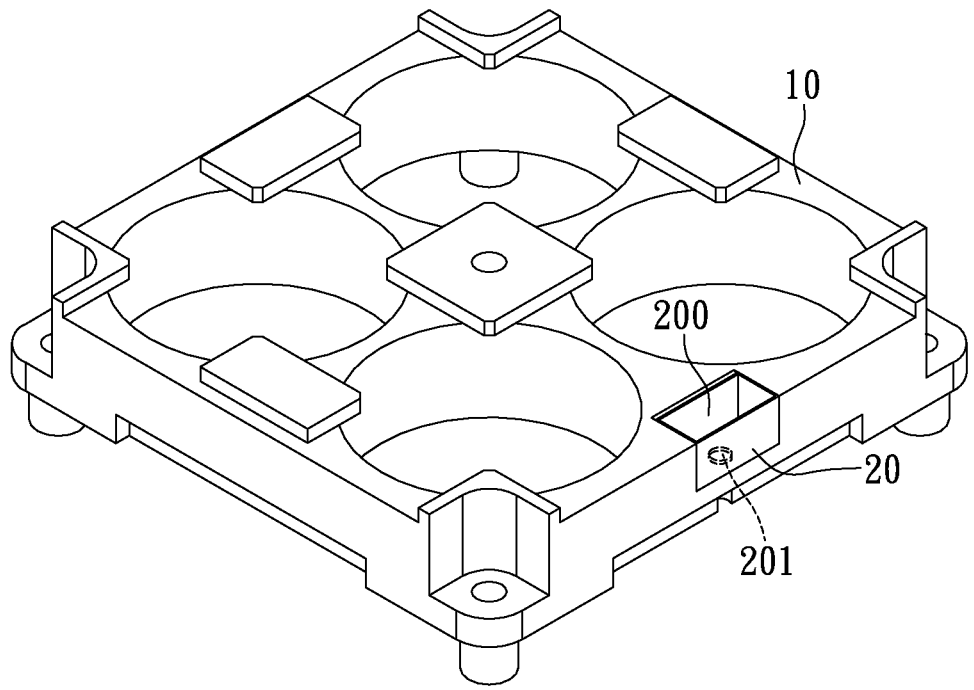
FIG. 3B shows a perspective, schematic view of the step S102 according to the first embodiment of the instant disclosure.

The step S102 is that: referring to FIGS. 1A, 2, and 3B, receiving at least one heat insulation body 20 in the receiving groove 100, wherein the heat insulation body 20 has at least one heat insulation groove 200 and at least one second securing hole 201 penetrating through the heat insulation groove 200 and corresponding to the first securing hole 101.

Figure 3C:
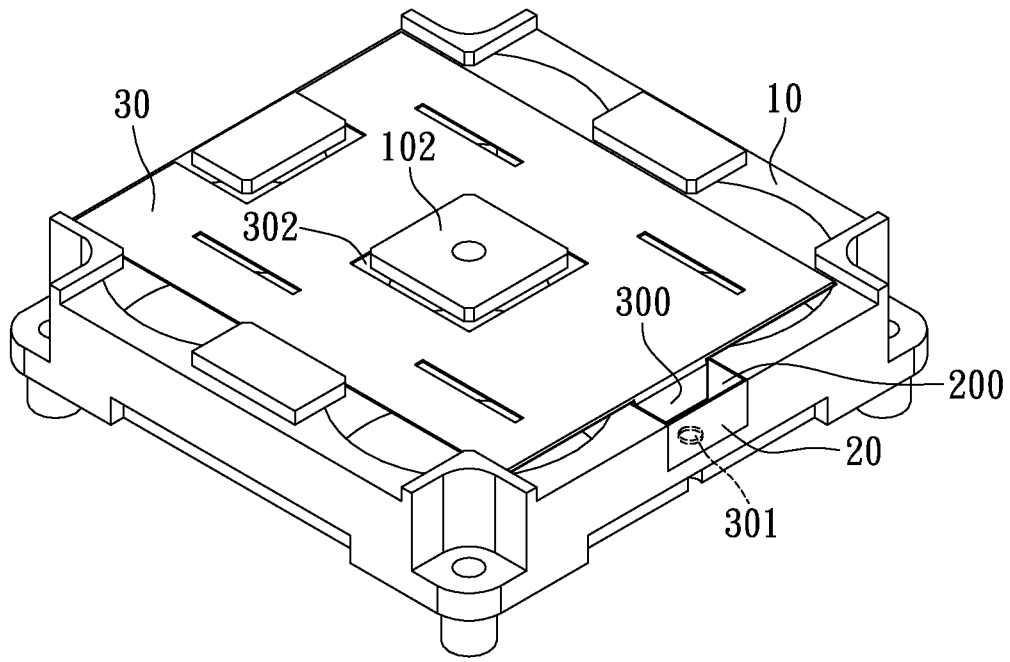
FIG. 3C shows a perspective, schematic view of the step S104 according to the first embodiment of the instant disclosure.

The step S104 is that: referring to FIGS. 1A, 2, and 3C, placing at least one conductive body 30 on the insulating body 10, wherein the conductive body 30 has at least one securing piece 300 downwardly extended into the heat insulation groove 200, and the securing piece 300 has at least one third securing hole 301 corresponding to the second securing hole 201. In addition, the conductive body 30 has at least one positioning opening 302, and the insulating body 10 has at least one positioning protrusion 102 corresponding to the positioning opening 302 and passing through the positioning opening 302.

Figure 3D:
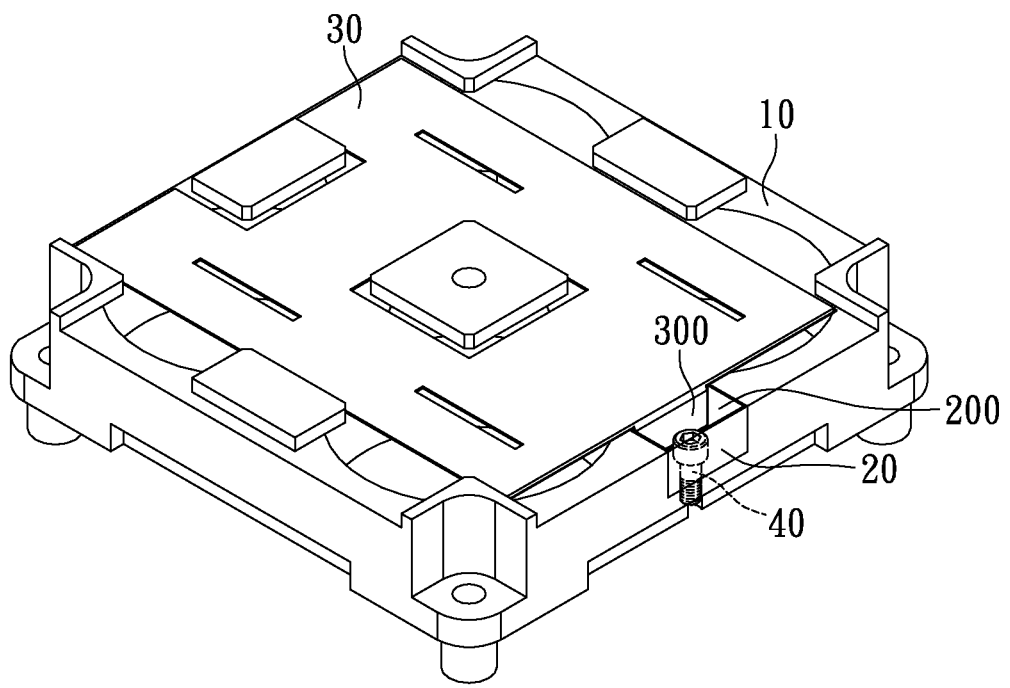
FIG. 3D shows a perspective, schematic view of the step S106 according to the first embodiment of the instant disclosure.

The step S106 is that: referring to FIGS. 1A, 2, and 3D, sequentially passing at least one securing element 40 through the third securing hole 301, the second securing hole 201, and the first securing hole 101 for fixing the securing piece 300 in the heat insulation groove 200.

Figure 3E:
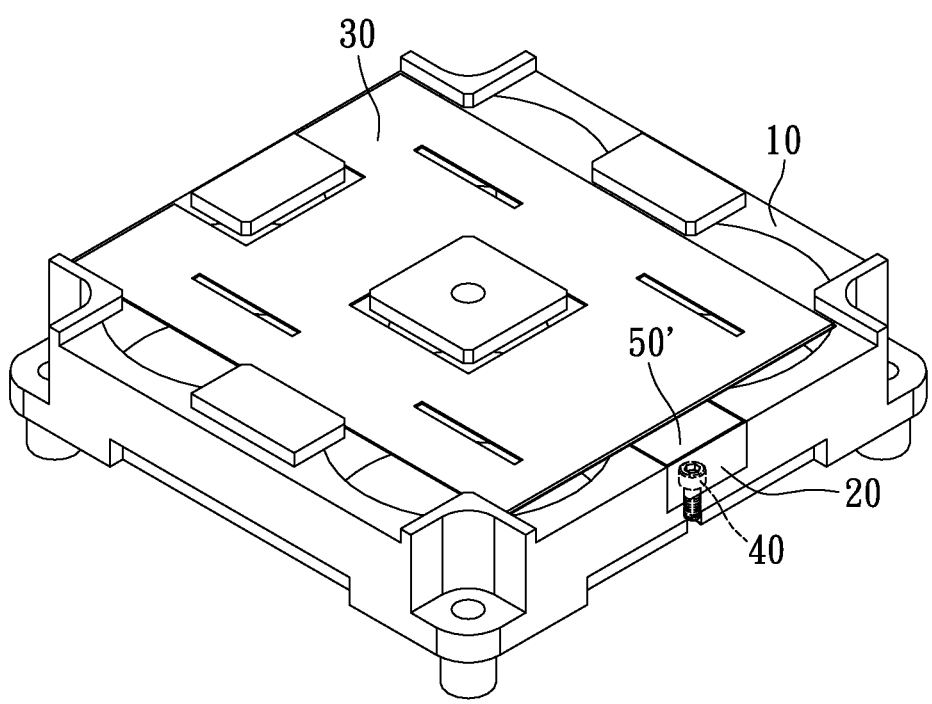
FIG. 3E shows a perspective, schematic view of the step S108 according to the first embodiment of the instant disclosure.

The step S108 is that: referring to FIGS. 1A, 2, and 3E, filling (such as pouring) a liquid filler 50' into the heat insulation groove 200 to cover and fix the securing piece 300 and the securing element 40. For example, the heat insulation groove 200 can be filled with the liquid filler 50' fully or partially, and the liquid filler 50' may be a liquid solder material or any type of liquid package material. However, the material of the liquid filler 50' used by the instant disclosure is an example and is not meant to limit the instant disclosure.

The step S110 is that: referring to FIGS. 1A, 1B, 2, and 3E, solidifying the liquid filler 50' to form a filling material 50 fixed inside the heat insulation groove 200. For example, the liquid filler 50' can be solidified by the forced convection. However, the method of executing the steps from S108 to S110 is an example and is not meant to limit the instant disclosure, thus any method of filling the filling material 50 into the heat insulation groove 200 to cover and fix the securing element 40 is protected in the instant disclosure.

Furthermore, after the step of filling the filling material 50 into the heat insulation groove 40 (after the step of S110), the method further comprises: removing the filling material 50 to expose the securing element 40 (as shown in FIG. 3D) (the step S112), and then removing the securing element 40 (as shown in FIG. 3C) to separate the conductive body 30 from the insulating body 10 (as shown in FIG. 3B) (the step S114).

Moreover, the step of removing the filling material 50 (the step S112) further comprises: liquefying the filling material 50 to form a liquid filler 50' (as shown in FIG. 3E) (the step S112(A)), and then removing the liquid filler 50' to expose the securing element 40 (as shown in FIG. 3D) (the step S112(B)). For example, the filling material 50 can be liquefied by heating (such as using) in the step S112(A), such as using a heating rod to liquefy the filling material 50. The liquid filler 50' can be removed by sucking in the step S112(B), such as using a suction device to remove the liquid filler 50'.

Second Embodiment

Figure 4A:
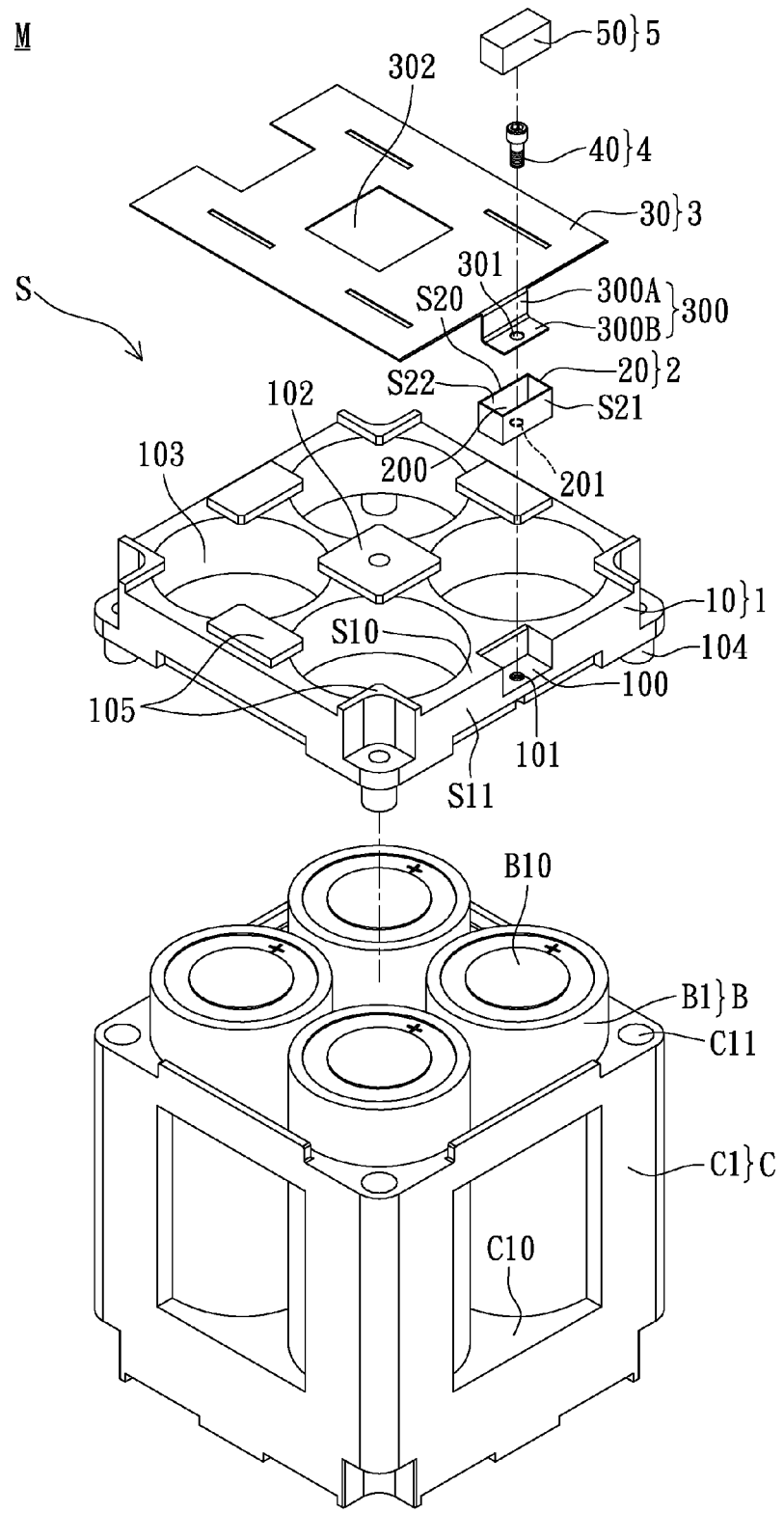
FIG. 4A shows one perspective, exploded, schematic view of the battery pack structure for increasing the securing reliability according to the second embodiment of the instant disclosure.
Figure 4B:
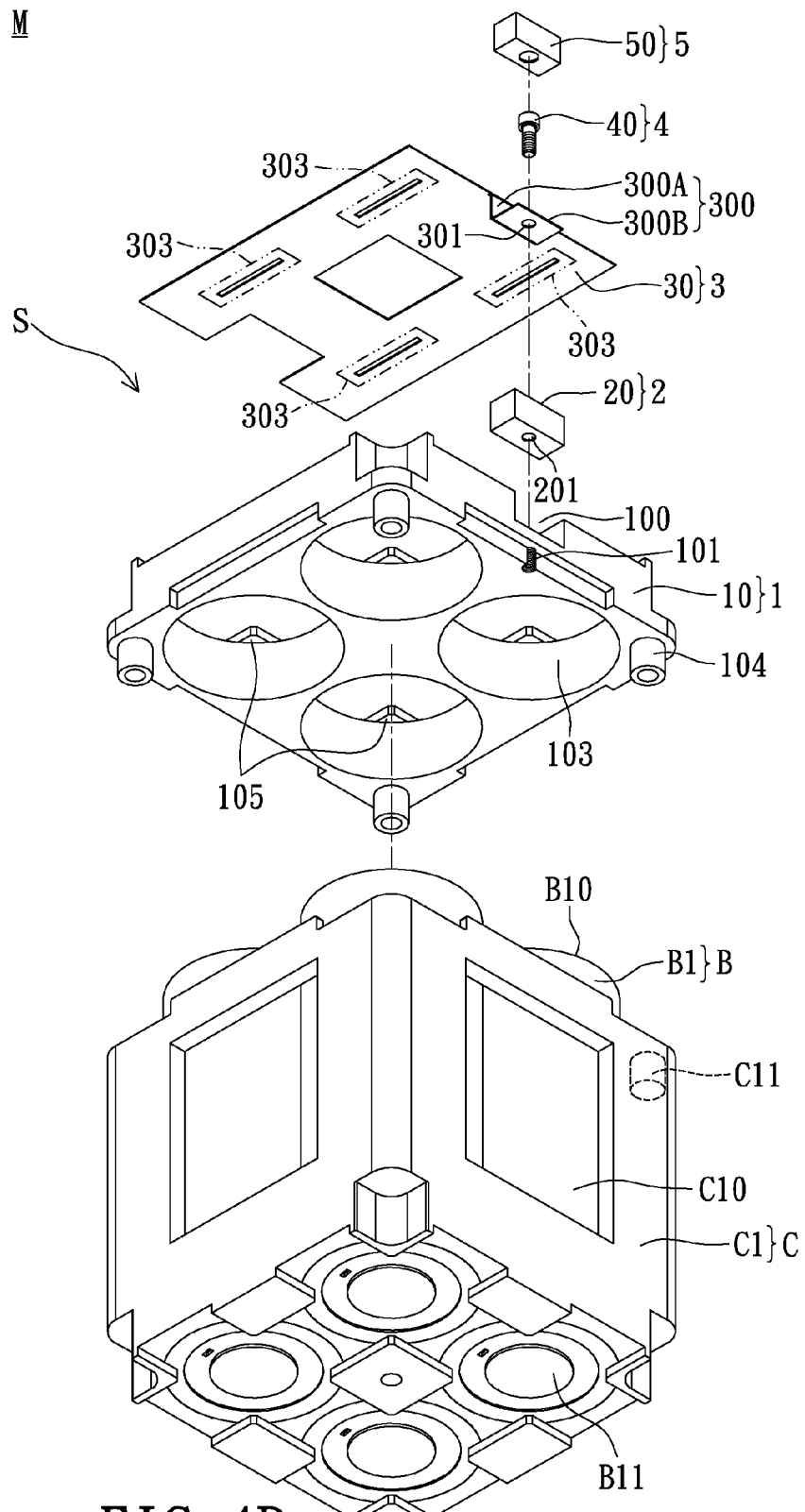
FIG. 4B shows another perspective, exploded, schematic view of the battery pack structure for increasing the securing reliability according to the second embodiment of the instant disclosure.
Figure 4C:
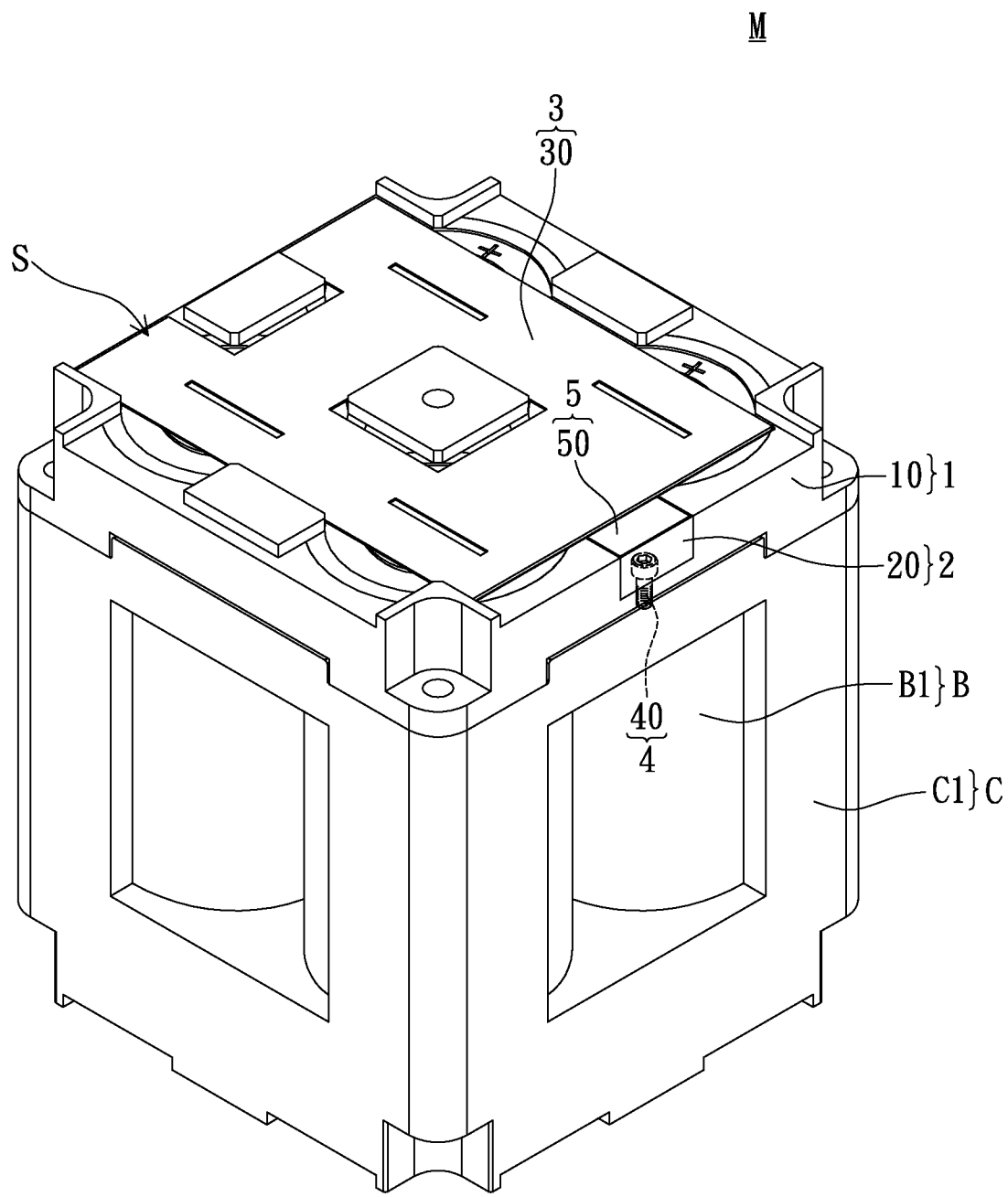
FIG. 4C shows a perspective, assembled, schematic view of the battery pack structure for increasing the securing reliability according to the second embodiment of the instant disclosure.

Referring to FIGS. 4A, 4B, and 4C, in which FIG. 4A is one perspective exploded schematic diagram, FIG. 4B is another perspective exploded schematic diagram, and FIG. 4C is a perspective assembled schematic diagram. The second embodiment of the instant disclosure provides a battery pack structure M using the electrical connection structure S, comprising: an outer casing unit C, a battery unit B, an insulating unit 1, a heat insulation unit 2, a conductive unit 3, a securing unit 4, and a filling unit 5.

Furthermore, the outer casing unit C includes at least one outer casing body C1. In addition, the outer casing unit C has at least one receiving space C10 formed in the inner portion thereof and the outer casing unit C includes a plurality of retaining holes C11 formed on the top side thereof. For example, the outer casing body C1 can be made of plastic material or any type of insulation material.

Moreover, the battery unit B includes a plurality of energy storing elements B1 received inside the receiving space C10 of the outer casing body C1, and each energy storing element B1 has a positive electrode side B10 and a negative electrode side B11. For example, the second embodiment can use four energy storing element B1 received inside the receiving space C10 of the outer casing body C1, and the positive electrode side B10 of each energy storing element B1 faces up.

Beside, the insulating unit 1 includes at least one insulating body 10 disposed on the outer casing body C1 to partially cover the battery unit B, and the insulating body 10 has at least one receiving groove 100, at least one first securing hole 101 penetrating through the receiving groove 100, and a plurality of exposing through holes 103 respectively corresponding to the energy storing elements B1. In addition, the insulating body 10 has a plurality of retaining pins 104 disposed on the bottom side thereof and respectively retained into the retaining holes C11. The insulating body 10 has a plurality of position limiting protrusions 105 disposed on the top side thereof to abut against the energy storing elements B1. In other words, when the retaining pins 104 are respectively retained into the retaining holes C11 to position the insulating body 10 on the outer casing body C1, the top side of each energy storing element B1 can abut against the corresponding position limiting protrusion 105 to prevent the energy storing elements B1 from being separated from the exposing through holes 103.

In addition, the heat insulation unit 2 includes at least one heat insulation body 20 received in the receiving groove 100, and the heat insulation body 20 has at least one heat insulation groove 200 and at least one second securing hole 201 penetrating through the heat insulation groove 200 and corresponding to the first securing hole 101.

Furthermore, the conductive unit 3 includes at least one conductive body 30 disposed on the insulating body 10 and electrically connected to the battery unit B. In addition, the conductive body 30 has at least one securing piece 300 downwardly extended into the heat insulation groove 200, and the securing piece 300 has at least one third securing hole 301 corresponding to the second securing hole 201. For example, the conductive body 30 has a plurality of conductive areas 303 (as the dotted line shown in FIG. 4B) disposed on the bottom side thereof, and each conductive area 303 can be electrically connected to each corresponding energy storing element B1 through each corresponding exposing through hole 103, and the positive electrode side B10 of each energy storing element B1 can be electrically connected to each corresponding conductive area 303 of the conductive body 30 by soldering.

Moreover, the securing unit 4 includes at least one securing element 40, and the securing element 40 can sequentially pass through the third securing hole 301, the second securing hole 201, and the first securing hole 101 for fixing the securing piece 300 inside the heat insulation groove 200. Besides, the filling unit 5 includes a filling material 50 received in the heat insulation groove 20 to cover and fix the securing piece 300 and the securing element 40 at the same time, thus the securing element 40 can be firmly fixed on a predetermined position. In addition, when one of the energy storing elements B1 is damaged, it is convenient to replace the damaged energy storing element B1 by a new energy storing element through the step S112(A), the step S112(B), and the step S114 of the first embodiment of the instant disclosure.

Therefore, comparing FIG. 4A with FIG. 1A, comparing FIG. 4B with FIG. 1B, and comparing FIG. 4C with FIG. 1C, the difference between the second embodiment and the first embodiment is that: the electrical connection structure S of the first embodiment is applied to the battery pack structure M. Moreover, not only the electrical connection structure S can be disposed on the top side of the outer casing body C1 to electrically connect to the positive electrode side B10 of each energy storing element B1, but also the instant disclosure can provide another electrical connection structure (not shown, but the same as the electrical connection structure S) to disposed on the bottom side of the outer casing body C1 to electrically connect to the negative electrode side B11 of each energy storing element B1. In other words, when two electrical connection structures S are respectively disposed on the top side and the bottom side of the outer casing body C1, the energy storing elements B1 can be electrically connected with each other in parallel through the two electrical connection structures S.

Third Embodiment

Figure 5:
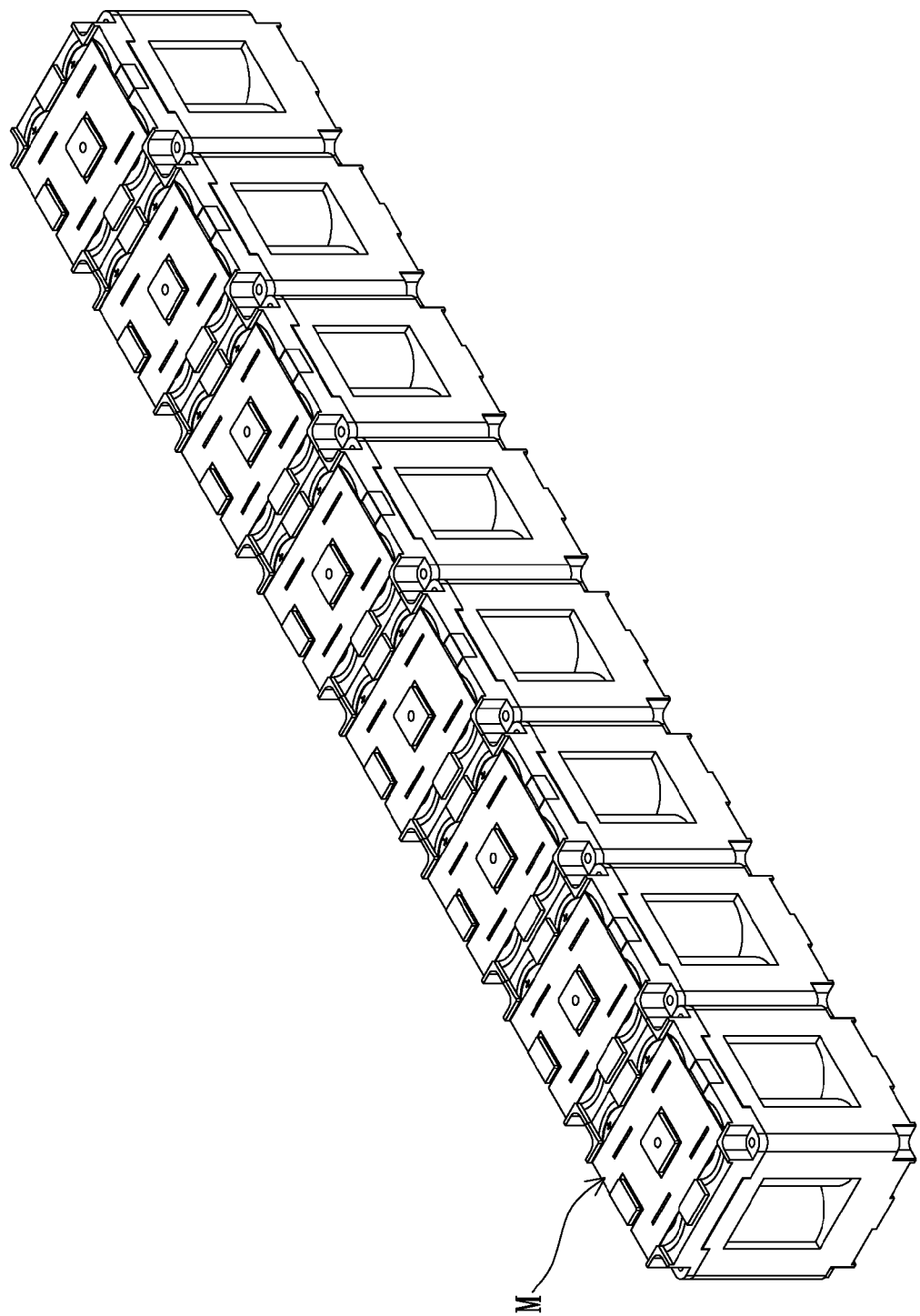
FIG. 5 shows a perspective, assembled, schematic view of the battery pack structures for increasing the securing reliability according to the third embodiment of the instant disclosure.

Referring to FIG. 5, the third embodiment can use a plurality of battery pack structures M combined to form a high power large-scale battery pack having high voltage or high current. The battery pack structures M can arranged as a predetermined shape according to different requirements. For example, the battery pack structures M can be abutted against each other and arranged along a straight line as shown in FIG. 5. In addition, the battery pack structures M can be electrically connected with each other in parallel by using a conductive piece (not shown) in the third embodiment. Of course, the battery pack structures M can be electrically connected with each other in series by other method. In other words, the battery pack structures M can be electrically connected with each other in parallel, in series, or a combination thereof according to different requirements.

In conclusion, because the filling material can be received in the at least one heat insulation groove to cover and fix the at least one securing element, the instant disclosure can prevent the at least one securing element from being loosened from the electrical connection structure or the battery pack structure.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An electrical connection structure for increasing the securing reliability, comprising:
    an insulating unit including at least one insulating body, wherein the at least one insulating body has at least one receiving groove and at least one first securing hole penetrating through the at least one receiving groove;
    a heat insulation unit including at least one heat insulation body received in the at least one receiving groove, wherein the at least one heat insulation body has at least one heat insulation groove and at least one second securing hole penetrating through the at least one heat insulation groove and corresponding to the at least one first securing hole;

a conductive unit including at least one conductive body disposed on the at least one insulating body, wherein the at least one conductive body has at least one securing piece downwardly extended into the at least one heat insulation groove, and the at least one securing piece has at least one third securing hole corresponding to the at least one second securing hole;

a securing unit including at least one securing element, wherein the at least one securing element sequentially passes through the at least one third securing hole, the at least one second securing hole, and the at least one first securing hole for fixing the at least one securing piece in the at least one heat insulation groove; and a filling unit including a filling material received in the at least one heat insulation groove to cover and fix the at least one securing element.

2. The electrical connection structure of claim 1, wherein the at least one conductive body has at least one positioning opening, and the at least one insulating body has at least one positioning protrusion corresponding to the at least one positioning opening and passing through the at least one positioning opening.

3. The electrical connection structure of claim 1, wherein the at least one receiving groove is downwardly concaved from the top surface of the at least one insulating body and inwardly concaved from one lateral surface of the at least one insulating body, the top surface of the at least one heat insulation body is substantially flushed with the top surface of the at least one insulating body, and one lateral surface of the at least one heat insulation body is substantially flushed with the lateral surface of the at least one insulating body.

4. The electrical connection structure of claim 1, wherein the at least one securing piece has a bending portion downwardly bent from the at least one conductive body and a securing portion outwardly extended from the bending portion, and the at least one third securing hole passes through the securing portion.

5. The electrical connection structure of claim 4, wherein the bending portion and the securing portion tightly contact the inner surface of the at least one heat insulation body, and the bending portion and the securing portion are covered with the filling material.

6. The electrical connection structure of claim 1, wherein the at least one securing element is a bolt sequentially passing through the at least one third securing hole, the at least one second securing hole, and the at least one first securing hole for fixing the position of the at least one heat insulation body relative to the at least one insulating body and fixing the position of the at least one conductive body relative to the at least one heat insulation body.

7. A method of manufacturing an electrical connection structure for increasing the securing reliability, comprising:

providing at least one insulating body, wherein the at least one insulating body has at least one receiving groove and at least one first securing hole penetrating through the at least one receiving groove;

receiving at least one heat insulation body in the at least one receiving groove, wherein the at least one heat insulation body has at least one heat insulation groove and at least one second securing hole penetrating through the at least one heat insulation groove and corresponding to the at least one first securing hole;

placing at least one conductive body on the at least one insulating body, wherein the at least one conductive body has at least one securing piece downwardly extended into the at least one heat insulation groove, and the at least one securing piece has at least one third securing hole corresponding to the at least one second securing hole;

sequentially passing at least one securing element through the at least one third securing hole, the at least one second securing hole, and the at least one first securing hole for fixing the at least one securing piece in the at least one heat insulation groove; and filling a filling material into the at least one heat insulation groove to cover and fix the at least one securing element.

8. The method of claim 7, wherein the step of filling the filling material into the at least one heat insulation groove further comprises:

filling a liquid filler into the at least one heat insulation groove; and solidifying the liquid filler to form the filling material that has been fixed inside the at least one heat insulation groove.

9. The method of claim 7, wherein after the step of filling the filling material into the at least one heat insulation groove, the method further comprises:

removing the filling material to expose the at least one securing element; and removing the at least one securing element to separate the at least one conductive body from the at least one insulating body.

10. The method of claim 9, wherein the step of removing the filling material further comprises:

liquefying the filling material to form a liquid filler; and
removing the liquid filler to expose the at least one securing element.

11. The method of claim 10, wherein the filling material is liquefied by heating.

12. The method of claim 10, wherein the liquid filler is removed by sucking.

13. A battery pack structure, comprising:

an outer casing unit including at least one outer casing body;

a battery unit including a plurality of energy storing elements received inside the at least one outer casing body;

an insulating unit including at least one insulating body disposed on the outer casing body to partially cover the battery unit, wherein the at least one insulating body has at least one receiving groove and at least one first securing hole penetrating through the at least one receiving groove;

a heat insulation unit including at least one heat insulation body received in the at least one receiving groove, wherein the at least one heat insulation body has at least one heat insulation groove and at least one second securing hole penetrating through the at least one heat insulation groove and corresponding to the at least one first securing hole;

a conductive unit including at least one conductive body disposed on the at least one insulating body and electrically connected to the battery unit, wherein the at least one conductive body has at least one securing piece downwardly extended into the at least one heat insulation groove, and the at least one securing piece has at least one third securing hole corresponding to the at least one second securing hole;

a securing unit including at least one securing element, wherein the at least one securing element sequentially passes through the at least one third securing hole, the at least one second securing hole, and the at least one first securing hole for fixing the at least one securing piece in the at least one heat insulation groove; and a filling unit including a filling material received in the at least one heat insulation groove to cover and fix the at least one securing element.

14. The battery pack structure of claim 13, wherein the at least one outer casing body has a plurality of retaining holes, and the at least one insulating body has a plurality of retaining pins disposed on the bottom side thereof and respectively retained into the retaining holes.

15. The battery pack structure of claim 13, wherein the at least one insulating body has a plurality of position limiting protrusions disposed on the top side thereof to abut against the energy storing elements.

16. The battery pack structure of claim 13, wherein the at least one insulating body has a plurality of exposing through holes respectively corresponding to the energy storing elements, the at least one conductive body has a plurality of conductive areas disposed on the bottom side thereof, and each conductive area is electrically connected to each corresponding energy storing element through each corresponding exposing through hole.

* * * * *